US008667200B1

(12) United States Patent  
Muliadi et al.

(10) Patent No.: US 8,667,200 B1  
(45) Date of Patent: Mar. 4, 2014

(54) FAST AND HIGHLY SCALABLE QUOTA-BASED WEIGHTED ARBITRATION

(75) Inventors: Lukito Muliadi, San Jose, CA (US); Raymond Hoi Man Wong, Richmond Hill (CA); Madhukiran V. Swarna, Portland, OR (US); Samuel H. Duncan, Arlington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 1045 days.

(21) Appl. No.: 12/712,109

(22) Filed: Feb. 24, 2010

Related U.S. Application Data

(60) Provisional application No. 61/244,857, filed on Sep. 22, 2009.

(51) Int. Cl.
  *G06F 12/00* (2006.01)
  *H04L 12/28* (2006.01)

(52) U.S. Cl.
  USPC .......................................... 710/241; 370/412

(58) Field of Classification Search
  USPC ............................ 710/241; 395/725; 370/412
  See application file for complete search history.

(56) References Cited

U.S. PATENT DOCUMENTS 6,246,256 B1 * 6/2001 Liu et al. ........................ 326/38
6,385,678 B2 * 5/2002 Jacobs et al. .................. 710/113
7,058,789 B2 * 6/2006 Henderson et al. ........... 711/220
7,350,003 B2 * 3/2008 Gish et al. ..................... 710/241
2010/0260198 A1 * 10/2010 Rojas-Cessa et al. ......... 370/417

FOREIGN PATENT DOCUMENTS

| WO | 2008/127610 | 10/2008 |
| WO | 2008/127622 | 10/2008 |
| WO | 2008/127623 | 10/2008 |

OTHER PUBLICATIONS

Moss, et al. "Toward Acceleration of RSA Using 3D Graphics Hardware," LNCS 4887, Dec. 2007, pp. 369-388.

* cited by examiner

*Primary Examiner* — Paul R Myers
*Assistant Examiner* — Christopher A Daley
(74) *Attorney, Agent, or Firm* — Patterson + Sheridan, L.L.P.

(57) ABSTRACT

One embodiment of the present invention sets forth a technique for arbitrating between a set of requesters that transmit data transmission requests to the weighted LRU arbiter. Each data transmission request is associated with a specific amount of data to be transmitted over the crossbar unit. Based on the priority state associated with each requester, the weighted LRU arbiter then selects the requester in the set of requesters with the highest priority. The weighted LRU arbiter then decrements the weight associated with the selected requester stored in a corresponding weight store based on the size of the data to be transmitted. If the decremented weight is equal to or less than zero, then the priority associated with the selected requester is set to a lowest priority. If, however, the decremented weight is greater than zero, then the priority associated with the selected requester is not changed.

20 Claims, 8 Drawing Sheets

FAST AND HIGHLY SCALABLE QUOTA-BASED WEIGHTED ARBITRATION

CROSS-REFERENCE TO RELATED APPLICATIONS

This application claims benefit of the U.S. provisional patent application titled, "Fast and Highly Scalable Quota-Based Weighted Arbitration," filed on Sep. 22, 2009 and having Ser. No. 61/244,857.

BACKGROUND OF THE INVENTION

1. Field of the Invention

The present invention generally relates to data transmission and, more specifically, to fast and highly scalable quota-based weighted arbitration.

2. Description of the Related Art

In a system where multiple clients can transmit data over a single physical connection, transmission requests from those clients need to be arbitrated. One arbitration scheme involves a least recently used (LRU) arbitration technique, where a client that has less recently been selected to transmit data over the physical connection is given priority over a more recently selected client. In operation, each client in a system where the LRU arbitration technique is implemented is assigned a priority. When a particular client waiting to transmit data and having a higher priority than all other clients waiting to transmit data is selected, the priority of the selected client is set to a lowest priority. In such a fashion, a client that was most recently selected to transmit data has a lower priority than other clients in the system.

One drawback of the LRU arbitration technique is that the arbitration is biased toward clients that send large amounts of data. Such a bias is introduced because the selection of a client is based purely on how recently the client was selected to transmit data irrespective of the amount of data transmitted. Therefore, in a system implementing an LRU arbitration technique, clients that transmit large amounts of data per transmission request consume an overall higher amount of bandwidth on the physical connection than clients that transmit small amounts of data per transmission request. Such an imbalance can lead to unnecessary data transmission delays thus affecting the overall performance of the system.

Accordingly, what is needed in the art is a system for arbitrating more fairly between different clients waiting to transmit data over a physical connection based on the amount of data transmitted by each client.

SUMMARY OF THE INVENTION

One embodiment of the present invention sets forth a weighted least recently used (LRU) arbiter configured to receive one or more requests issued by a set of clients, wherein each of the one or more requests is associated with specific data to be transmitted over the crossbar unit, and each client in the set of clients is associated with a different priority as well as a weight that indicates an amount of data the client can transmit over the crossbar unit, select a first request from the one or more requests that is received from a first client, wherein the priority associated with the first client is higher than the priority associated with each of the other clients in the set of clients, decrement the weight associated with the first client based on the size of the data associated with the first request, and maintain the priority associated with the first client when the decremented weight associated with the first client is greater than zero, or change the priority associated with the first client to a lowest priority when the decremented weight associated with the first client is less than or equal to zero.

One advantage of the disclosed technique is that, since the weighted LRU arbiter keeps track of the amount of data each requester is allowed to transmit over the crossbar unit, the weighted LRU arbiter implements a more balanced arbitration technique than a prior art LRU arbiter. Another advantage of the weighted LRU arbiter is that the hardware needed to implement the weighted arbitration technique involves simple logic that does not add any extra timing delay to the arbitration process.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
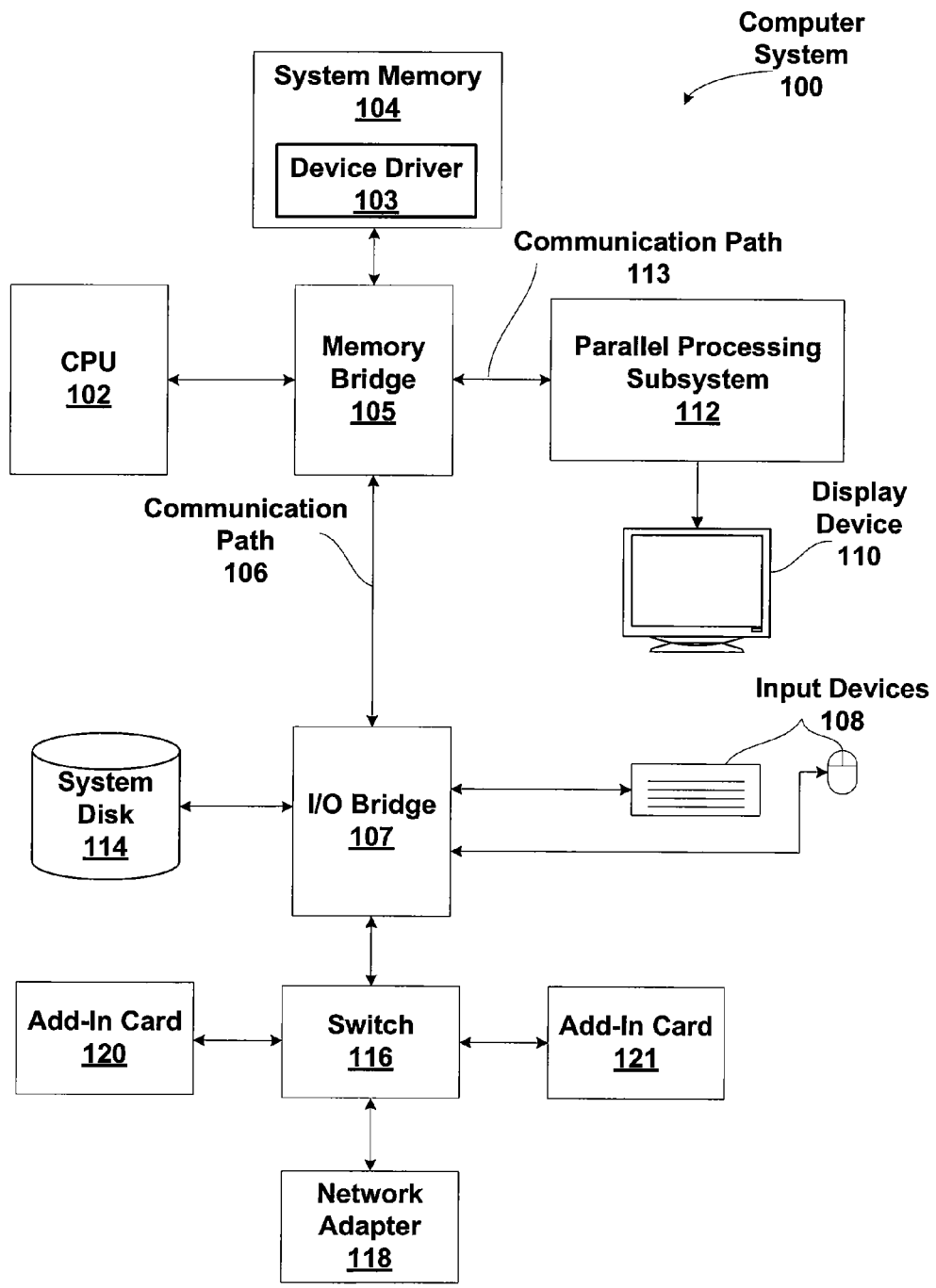
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
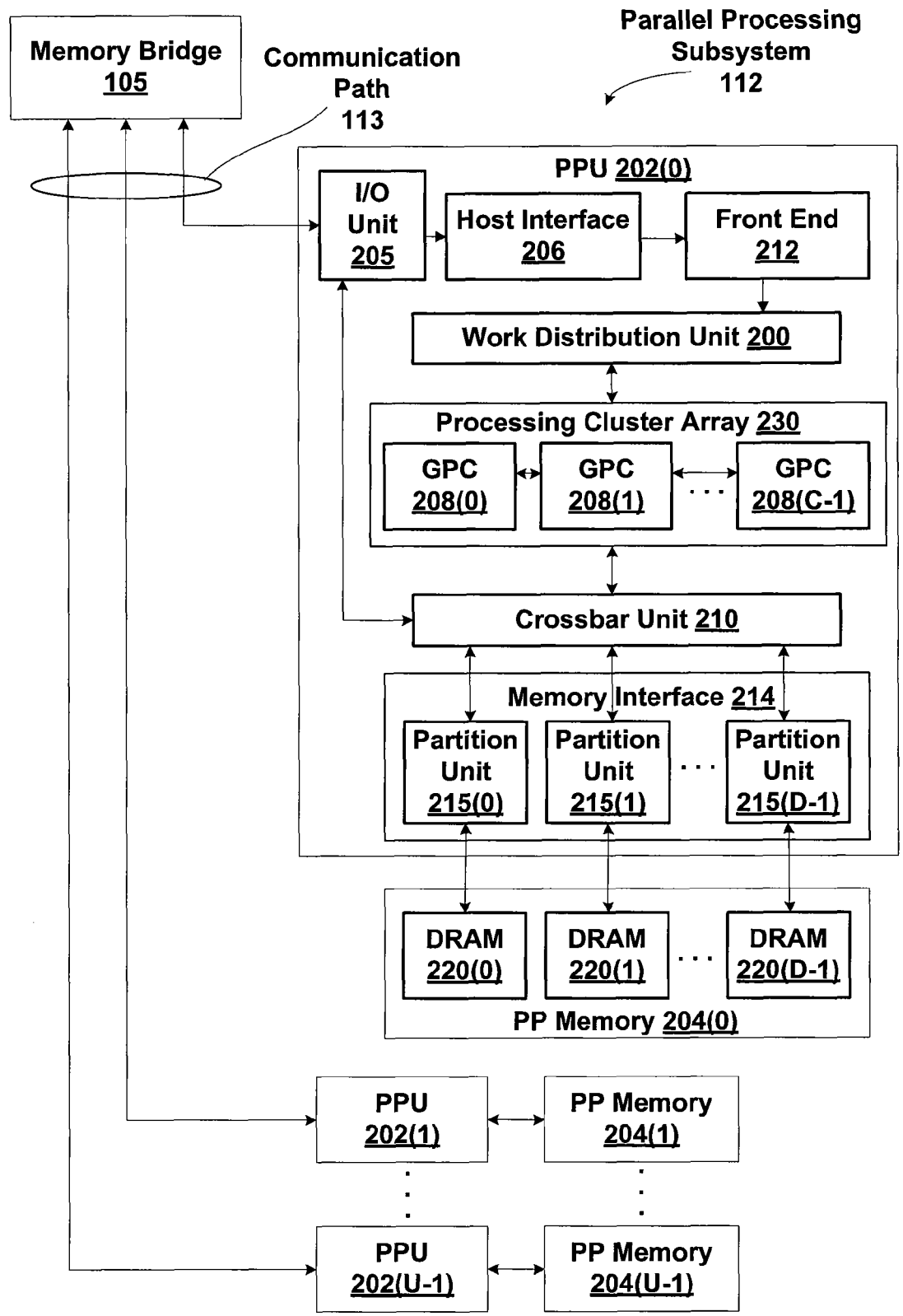
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
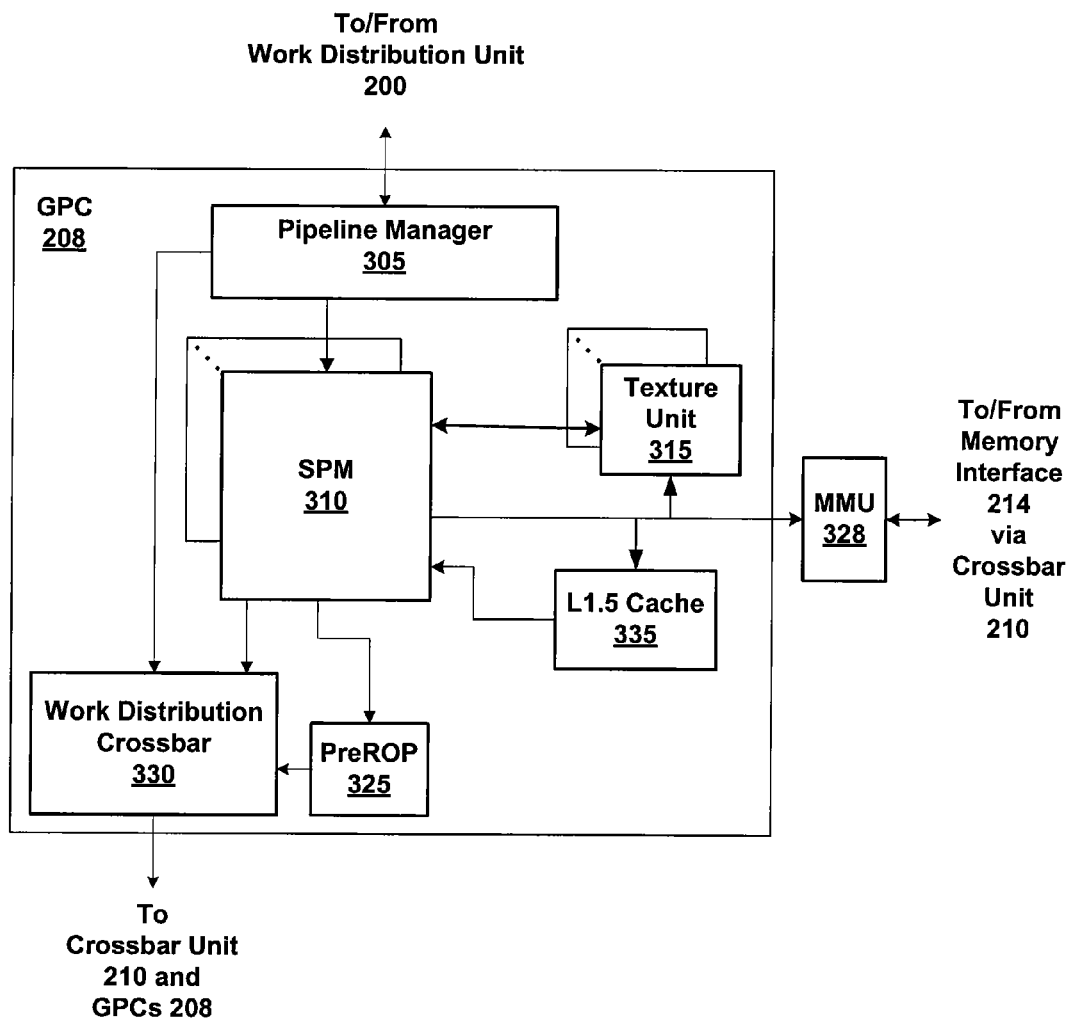
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
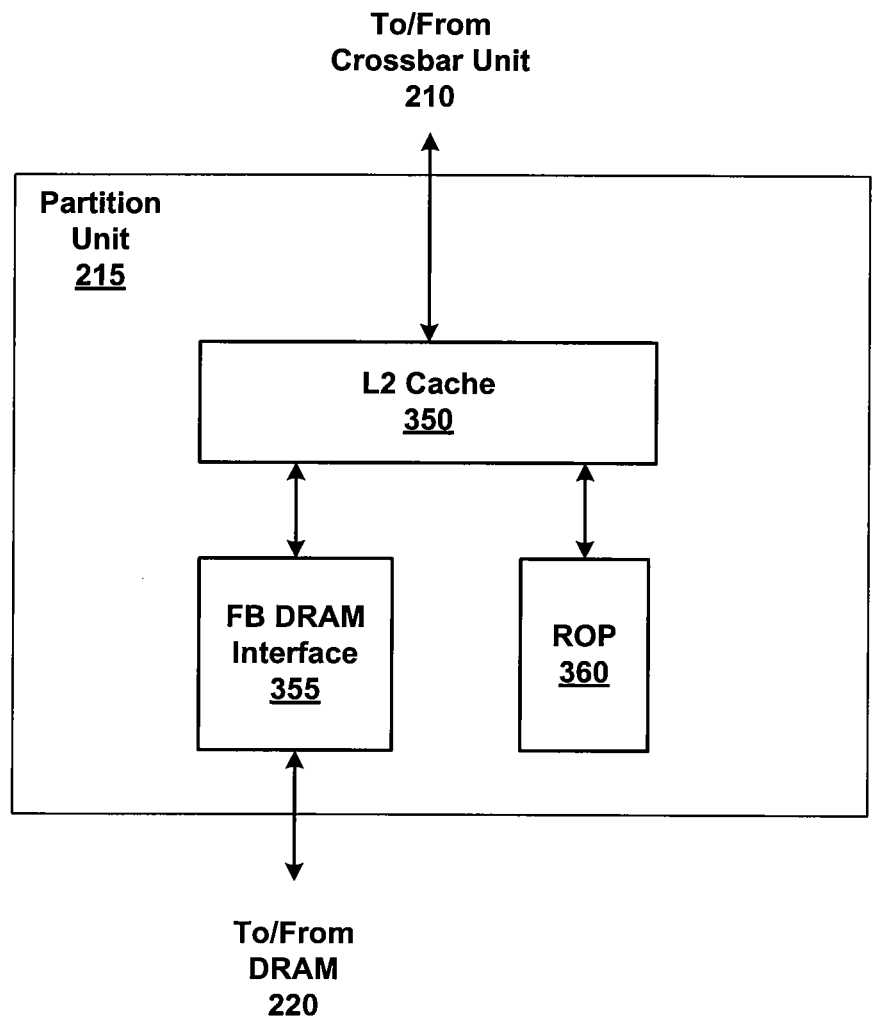
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
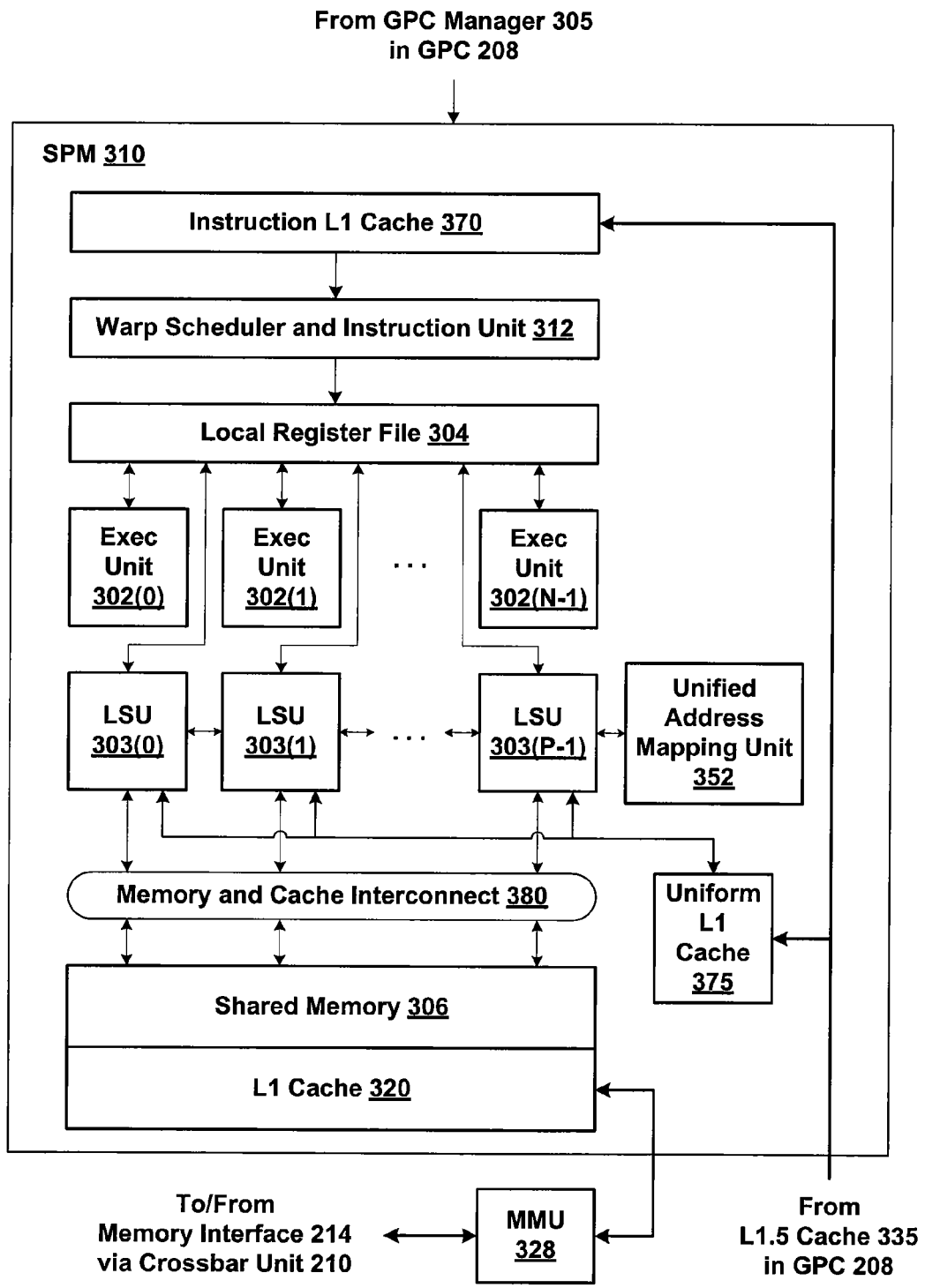
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Weighted Least Recently Used Arbitration

Figure 4:
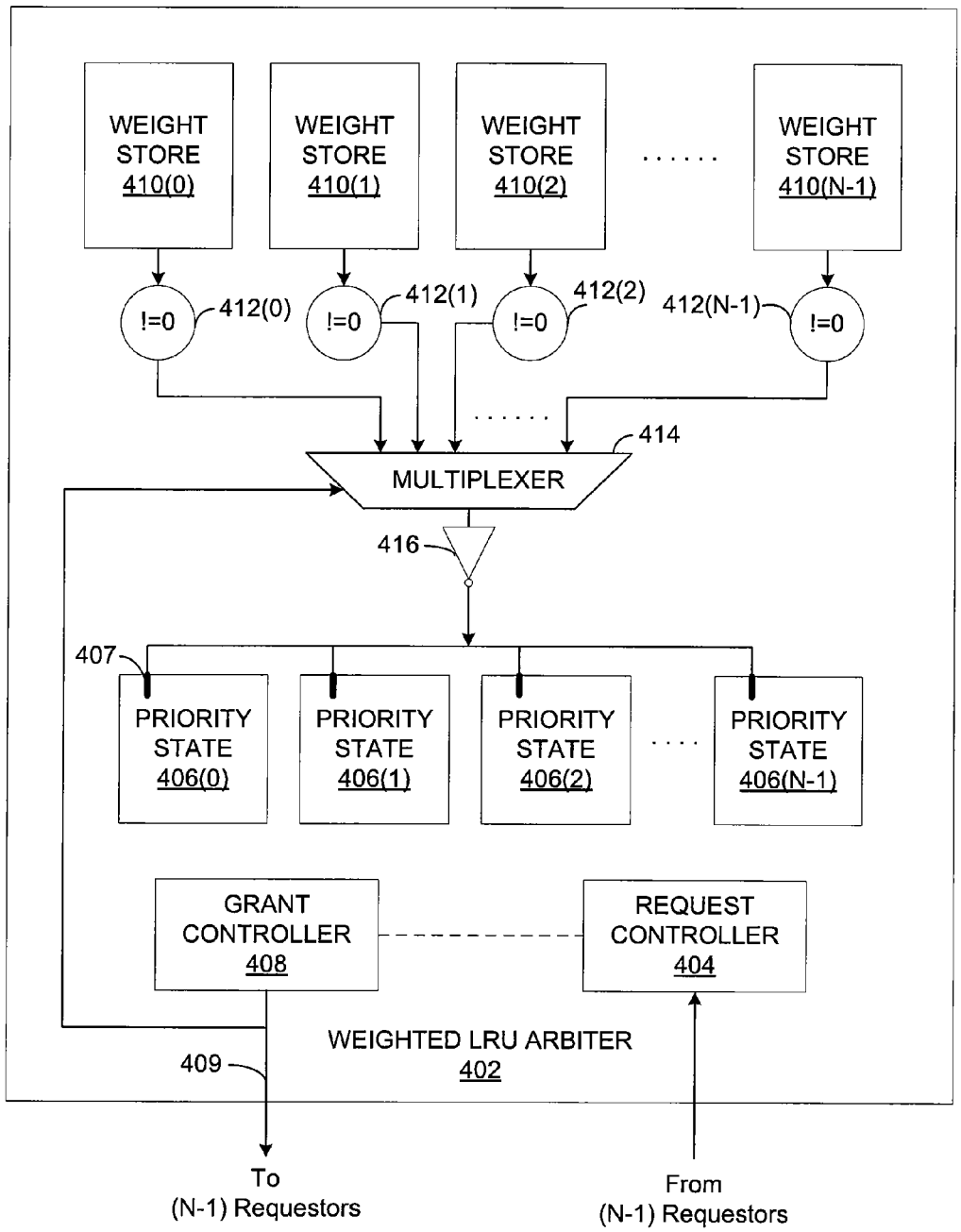
FIG. 4 illustrates a weighted least-recently-used (LRU) arbiter configured to arbitrate between different clients in the parallel processing subsystem requesting to transmit data on the crossbar unit, according to one embodiment of the present invention.

FIG. 4 illustrates a weighted least recently used (LRU) arbiter 402 configured to arbitrate between different clients in the parallel processing subsystem 112 requesting to transmit data on the crossbar unit 210, according to one embodiment of the present invention. The weighted LRU arbiter 402 receives data transmission requests from different requesters within the system, such as the GPCs 208 and the partition units 215. As shown, the weighted LRU arbiter 402 includes a request controller 404, priority states 406, a grant controller 408, weight stores 410, a logic block 412, a multiplexer 414 and an inverter 416.

Each of the different requesters is associated with a priority state stored in a corresponding priority state store 406. The priority state associated with a particular requester indicates whether the requester is higher or lower priority with respect to each of the other requesters. In addition, each of the different requesters is also associated with a weight stored in a corresponding weight store 410. The weight associated with a particular requester indicates a configurable credit that specifies the amount of data the particular requester can transmit over the crossbar unit 210. In one embodiment, data is transmitted over the crossbar unit 210 in transmission bursts of a pre-determined size, and the weight associated with a given client specifies the number of transmission bursts the client is permitted to transmit over the crossbar unit 210. Each weight store 410 is coupled to a corresponding logic block 412. For a specific weight store 410, such as weight store 410(2), the corresponding logic block 412, such as logic block 412(2), determines whether the weight stored in the weight store 410 is not equal to zero. When the weight is not equal to zero, the logic block 410 outputs a "true" signal to the multiplexer 414, and when the weight is equal to zero, the logic block 410 outputs a "false" signal to the multiplexer 414.

In operation, at a given clock cycle, each requester in a set of requesters transmits a data transmission request to the request controller 404 for transmitting data over the crossbar unit 210. Each data transmission request is associated with a specific amount of data to be transmitted over the crossbar unit 210. The request controller 404 first determines whether the weight associated with each requester in the set of requesters is equal to zero. If the weight associated with each requester is equal to zero, then the request controller 404 resets the weights associated with each requester in the set of requesters stored in the corresponding weight stores 410 to an initial configurable value on the next cycle. If, however, the weight associated with each requester is not equal to zero, then the request controller 404 does not modify the weights associated with the requesters in the set of requesters.

Based on the priority state associated with each requester stored in the corresponding priority state 406, the request controller 404 then selects the requester in the set of requesters with the highest priority. The request controller 404 decrements the weight associated with the selected requester stored in a corresponding weight store 410 based on the size of the data to be transmitted. The request controller 404 then indicates to the grant controller 408 to grant permission for transmitting data on the crossbar unit 210 to the selected requester via the grant signal 409. Simultaneously, the grant controller 408, via the grant signal 409, also selects the input of the multiplexer 414 associated with the selected requester for output to the inverter 416.

The inverter 416 inverts the signal received from the multiplexer 414 and delivers the signal to the enable pin 407 included in the priority state store 406 associated with the selected requester. When the signal received at the enable pin 407 is "true," i.e., when the weight associated with the selected requester is equal to zero, the priority associated with the selected requester is set to the lowest priority. However, when the signal received at the enable pin 407 is "false," i.e., when the weight associated with the selected requester is not equal to zero, the priority associated with the selected requester remains the same. In such a fashion, a requester that was granted permission to transmit data on a particular clock cycle retains priority if the weight associated with the requester is not equal to zero.

Importantly, the weighted least recently used (LRU) arbiter 402 is implemented such that the hardware needed to implement the weighted arbitration technique involves simple logic that does not add any extra timing delay to the arbitration process. Specifically, the logic that calculates, assigns, resets the weight for each requesting client does not show up in the logical path from the request to the grant. The weighted LRU arbiter 402 only adds one gate in the logic that sets the priority states based on the grant signals in comparison to a prior art LRU arbiter.

In different embodiments of the inventions, the initial weight associated with a requester in the parallel processing subsystem 112 may be based on the type of data the requester transmits, the number of requests the requester transmits, the amount of data the requester transmits, or any other factor that affects the performance of the parallel processing subsystem 112. In addition, the weight associated with the requester may be programmatically configurable and/or dynamically assigned during operation based on performance characteristics of the parallel processing subsystem 112.

In an alternate embodiment, the request controller 404 resets the weights associated with the requesters and stored in the weight stores 410 to an initial configurable value at pre-determined clock cycles and does not check the weights of the set of requesters at every clock cycle.

In another alternate embodiment, a round-robin or any other type of arbiter can implement the weighting technique described herein.

Figure 5A:
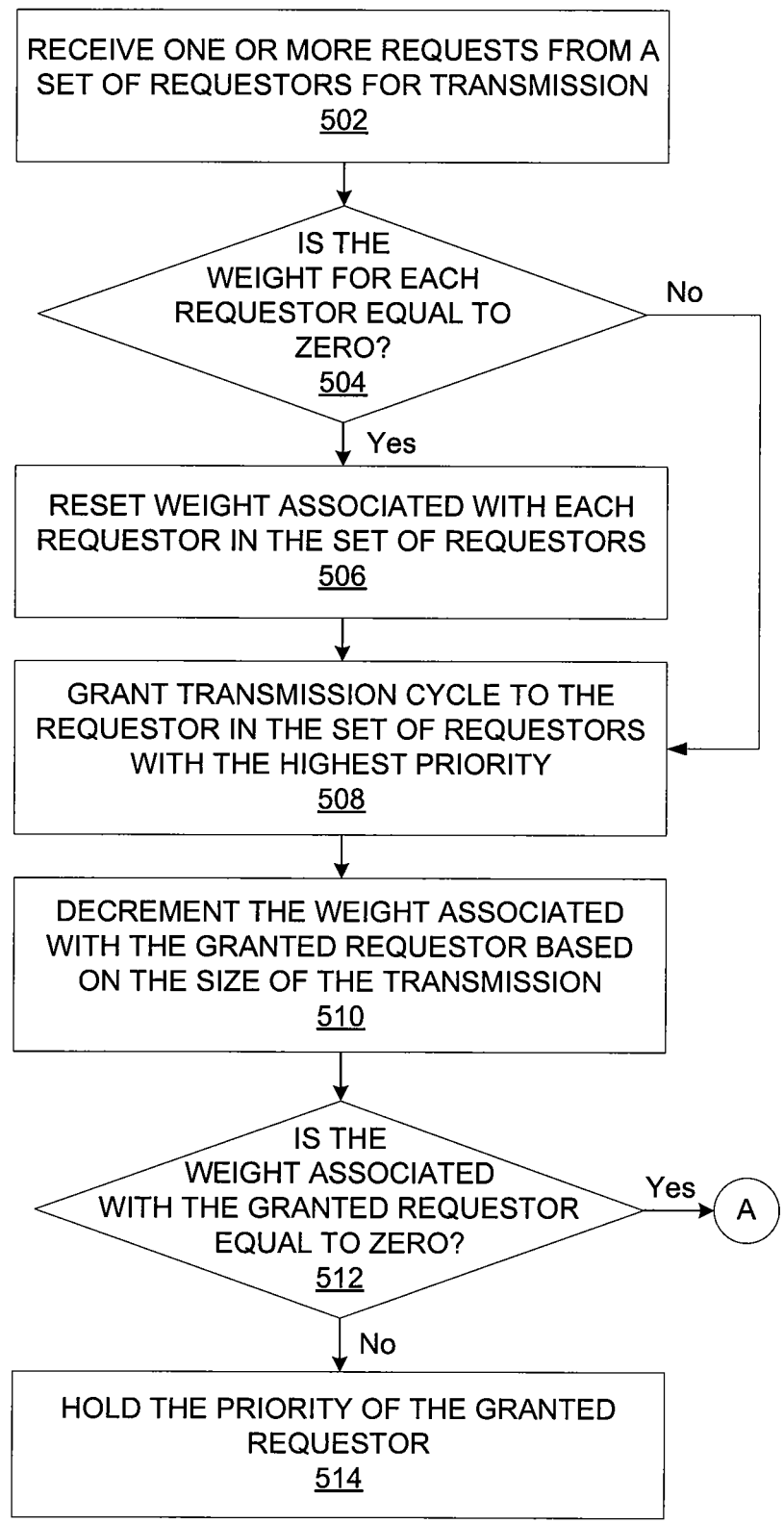
FIGS. 5A and 5B set forth a flow diagram of method steps for arbitrating between different clients requesting to transmit data on a given clock cycle, according to one embodiment of the present invention.
Figure 5B:
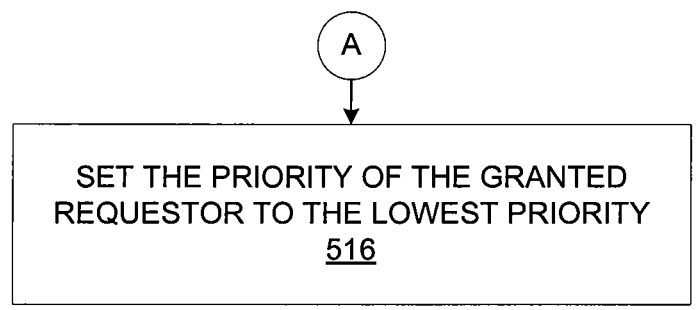

FIGS. 5A and 5B set forth a flow diagram of method steps for arbitrating between different clients requesting to transmit data on a given clock cycle, according to one embodiment of the present invention. Although the method steps are described in conjunction with the systems for FIGS. 1-4, persons skilled in the art will understand that any system configured to perform the method steps, in any order, is within the scope of the invention.

The method 500 begins at step 502, where the request controller 404 receives one or more transmission requests from a set of requesters within the parallel processing subsystem 112. Again, each data transmission request is associated with a specific amount of data to be transmitted over the crossbar unit 210. At step 504, the request controller 404 determines whether the weight associated with each requester in the set of requesters is equal to zero. If the weight associated with each requester is equal to zero, then the method proceeds to step 506, where the request controller 404 resets the weights associated with the requesters and stored in the weight stores 410 to an initial configurable value.

At step 508, based on the priority state associated with each requester stored in the priority states 406, the request controller 404 indicates to the grant controller 408 to grant permission for transmitting data on the crossbar unit 210 to the selected requester via the grant signal 409. At step 510, the request controller 404 decrements the weight associated with the granted requester stored in a corresponding weight store 410 based on the size of the data to be transmitted. Importantly, the weight associated with the granted requester is never set to zero, i.e., if the size of the data to be transmitted is greater than the weight associated with the granted requester, then the weight associated with the granted requester is set to zero. The request controller 404 then indicates to the grant controller 408 to grant permission for transmitting data on the crossbar unit 210 to the granted requester via the grant signal 409. Simultaneously, the grant signal 409 also selects the input of the multiplexer 414 associated with the granted requester for output to the inverter 416.

At step 512, if the weight associated with the granted requester is not equal to zero, i.e., the signal received at the enable pin 407 associated with the granted requester is false, then the method proceeds to step 514. At step 514, the priority associated with the granted requester and stored in the corresponding priority state store 406 is held, i.e., remains the same. If, however, at step 512, the weight associated with the granted requester is equal to zero, i.e., the signal received at the enable pin 407 associated with the granted requester is true, then the method proceeds to step 516. At step 516, the priority associated with the granted requester and stored in the corresponding priority state store is set to the lowest priority.

A weighted LRU arbiter receives data transmission requests from different requesters within the system, such as the GPCs and the partition units. Each of the different requesters is associated with a priority state that indicates whether the requester is higher or lower priority with respect to each of the other requesters. In addition, each of the different requesters is also associated with a weight that indicates a configurable credit that specifies the amount of data the particular requester can transmit over the crossbar unit.

In operation, at a given clock cycle, each requester in a set of requesters transmits a data transmission request to the weighted LRU arbiter for transmitting data over the crossbar unit. Each data transmission request is associated with a specific amount of data to be transmitted over the crossbar unit. Based on the priority state associated with each requester, the weighted LRU arbiter then selects the requester in the set of requesters with the highest priority. The weighted LRU arbiter then decrements the weight associated with the selected requester stored in a corresponding weight store based on the size of the data to be transmitted. If the decremented weight associated with the selected requester is equal to or less than zero, then the priority associated with the selected requester is set to a lowest priority. If, however, the decremented weight associated with the selected requester is greater than zero, then the priority associated with the selected requester is not changed.

One advantage of the disclosed technique is that, since the weighted LRU arbiter keeps track of the amount of data each requester is allowed to transmit over the crossbar unit, the weighted LRU arbiter implements a more balanced arbitration technique than a prior art LRU arbiter. Another advantage of the weighted LRU arbiter is that the hardware needed to implement the weighted arbitration technique involves simple logic that does not add any extra timing delay to the arbitration process.

Although the method steps are described in conjunction with the systems of FIGS. 1, 2, 3A, 3B, and 3C, persons skilled in the art will understand that any system configured to perform the method steps, in any order, is within the scope of the inventions.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for arbitrating between different clients that issue requests to transmit data over a crossbar unit, the method comprising:

receiving one or more requests issued by a set of clients, wherein each of the one or more requests is associated with specific data to be transmitted over the crossbar unit, and each client in the set of clients is associated with a different priority as well as a weight that indicates an amount of data the client can transmit over the crossbar unit;

selecting a first request from the one or more requests that is received from a first client, wherein the priority associated with the first client is higher than the priority associated with each of the other clients in the set of clients;

decrementing the weight associated with the first client based on the size of the data associated with the first request; and maintaining the priority associated with the first client when the decremented weight associated with the first client is greater than zero, or changing the priority associated with the first client to a lowest priority when the decremented weight associated with the first client is less than or equal to zero.

2. The method of claim 1, further comprising the step of resetting the weight associated with each client in the set of clients to an initial value when the weight associated with each requesting client in the set of clients is equal to or less than zero.

3. The method of claim 1, further comprising the step of resetting the weight associated with each client in the set of clients to an initial value at a pre-determined clock cycle.

4. The method of claim 1, wherein the weight associated with the first client has an initial value based on the type of data transmitted by the first client.

5. The method of claim 1, wherein the weight associated with the first client has an initial value based on the number of requests transmitted by the first client.

6. The method of claim 1, wherein the weight associated with the first client has an initial value that is configured programmatically.

7. The method of claim 1, wherein the weight associated with the first client has an initial value that is dynamically configured based on performance.

8. The method of claim 1, wherein the first client, once selected, transmits the data associated with the first request over the crossbar unit to a destination client.

9. The method of claim 1, wherein data is transmitted over the crossbar unit in transmission bursts of a pre-determined size, and the weight associated with the first client specifies the number of transmission bursts that the first client is permitted to transmit over the crossbar unit.

10. A weighted least recently used (LRU) arbiter, comprising:
a request controller, configured to:
receive one or more requests issued by a set of clients, wherein each of the one or more requests is associated with specific data to be transmitted over a crossbar unit, and each client in the set of clients is associated with a different priority as well as a weight that indicates an amount of data the client can transmit over the crossbar unit,
select a first request from the one or more requests that is received from a first client, wherein the priority associated with the first client is higher than the priority associated with each of the other clients in the set of clients, and
decrement the weight associated with the first client based on the size of the data associated with the first request; and
a grant controller, configured to:
maintain the priority associated with the first client when the decremented weight associated with the first client is greater than zero, or
change the priority associated with the first client to a lowest priority when the decremented weight associated with the first client is less than or equal to zero.

11. The weighted LRU arbiter of claim 10, wherein the request controller is further configured to reset the weight associated with each client in the set of clients to an initial value when the weight associated with each requesting client in the set of clients is equal to or less than zero.

12. The weighted LRU arbiter of claim 10, wherein the request controller is further configured to reset the weight associated with each client in the set of clients to an initial value at a pre-determined clock cycle.

13. The weighted LRU arbiter of claim 10, wherein the weight associated with the first client has an initial value based on the type of data transmitted by the first client.

14. The weighted LRU arbiter of claim 10, wherein the weight associated with the first client has an initial value based on the number of requests transmitted by the first client.

15. The weighted LRU arbiter of claim 10, wherein the weight associated with the first client has an initial value that is configured programmatically.

16. The weighted LRU arbiter of claim 10, wherein the weight associated with the first client has an initial value that is dynamically configured based on performance.

17. The weighted LRU arbiter of claim 10, wherein the first client, once selected, transmits the data associated with the first request over the crossbar unit to a destination client.

18. The weighted LRU arbiter of claim 10, wherein data is transmitted over the crossbar unit in transmission bursts of a pre-determined size, and the weight associated with the first client specifies the number of transmission bursts that the first client is permitted to transmit over the crossbar unit.

19. A system, comprising:
a crossbar unit configured to transmit data;
one or more clients configured to issue requests for transmitting data over the crossbar unit; and
a weighted least recently used (LRU) arbiter configured to:
receive one or more requests issued by a set of clients of the one or more clients, wherein each of the one or more requests is associated with specific data to be transmitted over the crossbar unit, and each client in the set of clients is associated with a different priority as well as a weight that indicates an amount of data the client can transmit over the crossbar unit,
select a first request from the one or more requests that is received from a first client, wherein the priority associated with the first client is higher than the priority associated with each of the other clients in the set of clients,
decrement the weight associated with the first client based on the size of the data associated with the first request, and
maintain the priority associated with the first client when the decremented weight associated with the first client is greater than zero, or
change the priority associated with the first client to a lowest priority when the decremented weight associated with the first client is less than or equal to zero.

20. The system of claim 19, wherein the weighted LRU arbiter is further configured to reset the weight associated with each client in the set of clients to an initial value when the weight associated with each requesting client in the set of clients is equal to or less than zero.

* * * * *